(12) United States Patent
Ben-Lulu et al.

(10) Patent No.: US 8,116,318 B2
(45) Date of Patent: Feb. 14, 2012

(54) METHOD FOR SCHEDULING ATM CELLS AND A DEVICE HAVING ATM CELL SCHEDULING CAPABILITIES

(75) Inventors: Haim Ben-Lulu, Rehovat (IL); Aviram Hertzberg, Kohav Yair (IL); Ilan Weiss, Beer Sheva (IL)

(73) Assignee: Freescale Semiconductor, Inc., Austin, TX (US)

( * ) Notice: Subject to any disclaimer, the term of this patent is extended or adjusted under 35 U.S.C. 154(b) by 93 days.

(21) Appl. No.: 12/279,655

(22) PCT Filed: Feb. 17, 2006

(86) PCT No.: PCT/IB2006/050522
§ 371 (c)(1),
(2), (4) Date: Aug. 15, 2008

(87) PCT Pub. No.: WO2007/093858
PCT Pub. Date: Aug. 23, 2007

(65) Prior Publication Data
US 2008/0317041 A1 Dec. 25, 2008

(51) Int. Cl.
*H04L 12/56* (2006.01)
(52) U.S. Cl. ................................ 370/395.42
(58) Field of Classification Search ........... 370/230, 370/230.1, 537, 395.42; 709/225
See application file for complete search history.

(56) References Cited

U.S. PATENT DOCUMENTS

| | | | |
|---|---|---|---|
| 5,491,691 A * | 2/1996 | Shtayer et al. | 370/395.42 |
| 5,831,975 A | 11/1998 | Chen et al. | |
| 5,844,890 A * | 12/1998 | Delp et al. | 370/230 |
| 5,982,776 A | 11/1999 | Manning et al. | |
| 6,665,301 B1 | 12/2003 | Wu | |
| 6,687,229 B1 | 2/2004 | Kataria et al. | |
| 6,721,796 B1 | 4/2004 | Wong | |
| 6,795,445 B1 | 9/2004 | Kabie et al. | |
| 6,813,272 B1 | 11/2004 | An et al. | |
| 7,593,433 B1 * | 9/2009 | Wu et al. | 370/537 |
| 7,657,628 B1 * | 2/2010 | McDysan et al. | 709/225 |
| 2002/0114277 A1 * | 8/2002 | Kyusojin | 370/230.1 |
| 2004/0081167 A1 | 4/2004 | Hassan-Ali et al. | |
| 2004/0196788 A1 | 10/2004 | Lodha | |

* cited by examiner

*Primary Examiner* — Derrick Ferris
*Assistant Examiner* — Gbemileke Onamuti

(57) ABSTRACT

A method for scheduling a transmission of ATM cells, the method includes: receiving an indication that a scheduling session should starts; and repeating the stages of: selecting a channel representative queue out of multiple queues that are associated with different quality of service traffic threads that belong to that channel; scheduling a transmission of frames from channel representative queues and from single queue channels; wherein the scheduling comprises processing a scheduling table that comprises multiple sets of entries, wherein each set of entries is associated with a different transmission priority level, and wherein at least one set of entries comprises a link to a transmission parameter table that is associated with a channel representative queue.

18 Claims, 10 Drawing Sheets

METHOD FOR SCHEDULING ATM CELLS AND A DEVICE HAVING ATM CELL SCHEDULING CAPABILITIES

FIELD OF THE INVENTION

The invention relates to a device having ATM cell scheduling capabilities and to a method for scheduling a transmission of ATM cells.

BACKGROUND OF THE INVENTION

In today's communications, digital networks transport large amounts of information. Network services can be, for example, traditional voice phone, facsimile, television, audio and video broadcast, and data transfer.

With the increasing need of information exchange in the global society, the capacity of existing and future networks must be used efficiently. Multiplexers switch different network services to a single network in such a way that every service is fully maintained and does not disturb other services.

Asynchronous Transfer Mode (ATM) is one of the most commonly used communication protocols. ATM is a connection-oriented protocol. ATM protocol assigns virtual channels to each ATM cell. The virtual channel is supported by a physical link. ATM protocol compliant devices process information by framing the information to ATM cells. An ATM cell includes a payload as well as a header. The header includes various fields that map the ATM cell to the virtual channel. These fields include the virtual channel identifier (VCI) field and the virtual path identifier (VPI) field.

The ATM cell is associated with a physical layer (PHY) value that represents the physical link on which the ATM cell arrives or originated from. A device, such as a media access unit, an UTOPIA bus manager as well as an ATM switch associate the PHY value with the ATM cell.

Various adaptation layers were developed in order to enable ATM based network to support a variety of services and protocols that are not based upon ATM technology, such as IP, Gigabit Ethernet, Frame Relay, SONET, SDH and wireless application. Five types of adaptation layers were defined AAL1-AAL5. Each adaptation type layer supports different services. AAL5 is very popular. It adapts multi-cell higher layer payloads (or frames) into ATM with minimal error checking and no error detection. AAL5 assumes that the conveyed data is sequential from the end user and uses the Payload Type Indicator (PTI) bit to indicate the last cell in a transmission Multiple ATM cells can convey one upper layer frame. Various scheduling mechanisms were developed in order to schedule the transmission of ATM cells. U.S. patent application publication serial number 2004/0081167 of Hassan-Ali et al., U.S. Pat. No. 6,813,272 of An et al., U.S. Pat. No. 5,831,975 of Chen et al., U.S. Pat. No. 6,665,301 of Wu, U.S. Pat. No. 6,795,445 of Kabie et al., and U.S. Pat. No. 6,687,229 of Kataria, all being incorporated herein by reference, illustrates various devices and method for scheduling ATM traffic.

In some cases the number of possible allocated VCI values is smaller than the overall number of traffic threads originating from a serviced group of users. ATM defines a single channel for each combination of VPI/VCI, especially when using AAL5 adaptation layer. Merely assigning the same VPI/VCI values to different threads can cause undesired information interleaving.

A Digital Subscribers Line Access Multiplexer (DSLAM) may face such a problem. A DSLAM is connected between a backbone network and between many users via digital subscriber modems. A single DSLAM can be connected to many users. Each user can exchange various types of information (data, video, audio), using a single cable modem. Typically, each type of traffic can be associated with a different kind of quality of service. In many cases there are not enough VPI/VCI combinations for each traffic thread. In addition, merely providing the same quality of service to all the different types of traffic is inefficient and can cause timing violations.

There is a need to provide efficient methods and devices for scheduling ATM cells.

SUMMARY OF THE PRESENT INVENTION

A device having ATM cell scheduling capabilities and for a method for scheduling ATM cells, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

A method for scheduling a transmission of ATM cells, the method includes: (i) receiving an indication that a scheduling session should starts; (ii) selecting a channel representative queue out of multiple queues that are associated with different quality of service traffic threads that belong to that channel, and (iii) scheduling a transmission of frames from channel representative queues and from single queue channels. The scheduling includes processing a scheduling table that includes multiple sets of entries. Each set of entries is associated with a different transmission priority level. At least one set of entries includes a link to a transmission parameter table that is associated with a channel representative queue.

A device for scheduling a transmission of ATM cells, the device includes a memory unit adapted to store multiple buffers, and a communication controller. The communication controller is adapted to repetitively: (i) select a channel representative queue out of multiple queues that are associated with different quality of service traffic threads that belong to that channel, and to (ii) schedule a transmission of frames from channel representative queues and from single queue channels. The communication controller is adapted to schedule a transmission of frames by processing a scheduling table that includes multiple sets of entries. Each set of entries is associated with a different transmission priority level. At least one set of entries comprises a link to a transmission parameter table that is associated with a channel representative queue.

Figure 1:
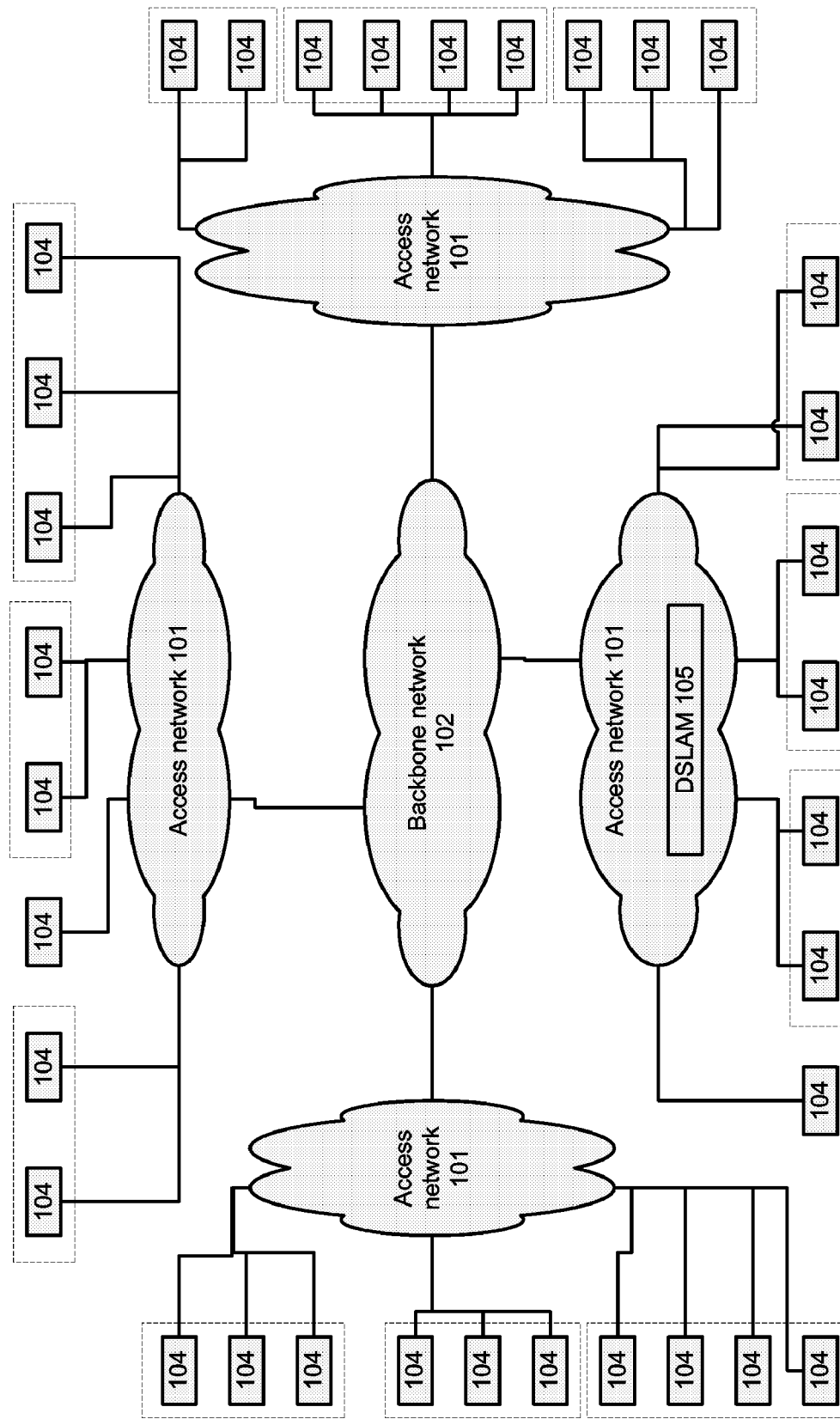
FIG. 1 illustrates a communication network, according to an embodiment of the invention.

FIG. 1 illustrates a communication network 100 according to an embodiment of the invention.

Communication network 100 is connected to many user devices (denoted 104). The communication network 100 can include one or more access networks 101 as well as backbone network 102. The access networks 101, backbone network 102, as well as the interface between the access networks 101 and backbone network 102 can include one or more switches or routers. Conveniently, theses switches or routers include communication devices such as communication device 10 of FIG. 2. A communication device 10 can include one or more integrated circuits such as the PowerQuicc™ communication integrated circuits of Freescale™ Inc. An access network 101 can include one or more DSLAMs.

Communication network 100 can service a large variety of users as well as a large number of users. Many users can be domestic users or otherwise users that are characterized by having a relatively small number of devices (denoted 104). A dashed box surrounds the devices that belong to a single user. Each user can be associated with a unique PHY value. Various switches and routers within the various networks can assign different PHY values to the same user, as long as they are able to differentiate between traffic that originates from different users. A small number of combinations of VCI field and VPI fields are allocated per user. Conveniently, a small amount of VCI/VPI values is allocated for a large number of users.

In cases where multiple types of traffic should be services the access network single PHY value can be used to transmit traffic of various types. In order to support many quality of service level traffic a multi-stage scheduling and selection mechanism is provided. A first level scheduling schedules between users or between channels. There are two types of channels—single queue channels and multiple queue channels. Multiple queue channels include multiple channels, whereas a queue is defined per quality of service level. Thus, traffic of different types can receive different levels of service.

When the scheduler schedules a transmission from a multiple queue channel, it actually schedules a transmission of a selected queue out of the multiple queues of that channel. This selected queue is also referred to as a channel representative queue. Once this queue is scheduled for transmission a new selection process is executed in order to select the next channel representative queue.

Figure 2:
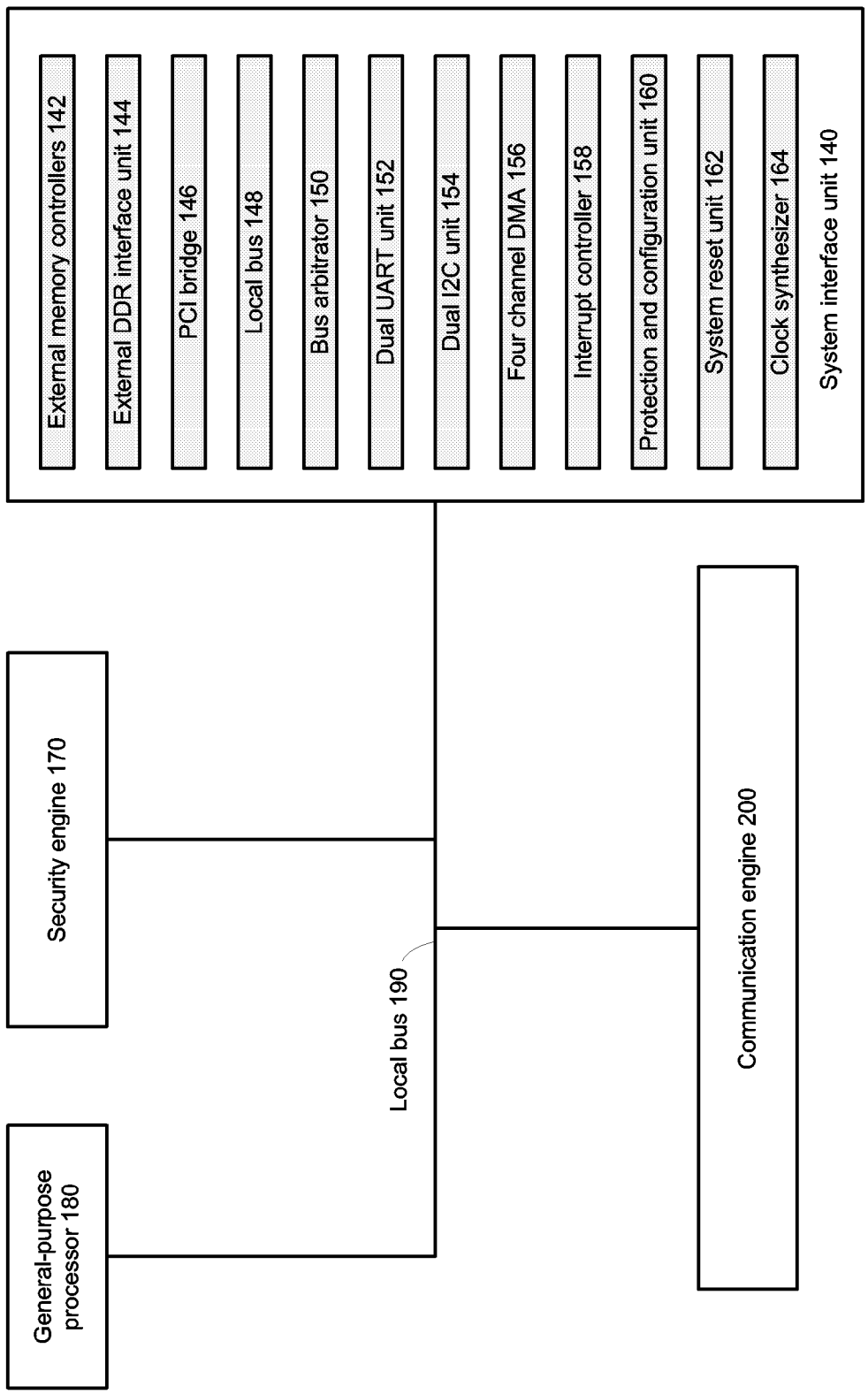
FIG. 2 illustrates a communication device, according to an embodiment of the invention.

FIG. 2 illustrates a communication device 10, according to an embodiment of the invention.

Communication device 10 includes a first processor, such as general-purpose processor 180, a security engine 170, system interface unit 140, communication engine 200 and multiple ports (not shown). Components 180, 170, 140 and 200 are connected to each other by central bus 190.

The general-purpose processor 180 can include multiple execution units such as but not limited to an integer unit, a branch processing unit, a floating point unit, a load/store unit and a system register unit. It can also include various cache memories, dynamic power management unit, translation look aside buffers, and the like.

The general-purpose processor 180 controls the communication device 10 and can execute various programs according to the required functionality of communication device 10. The general-purpose processor 180 can be a member of the PowerPC™ family but this is not necessarily so.

The security engine 170 can apply various security mechanisms including encryption based mechanisms and the like.

Communication device 10 can be connected to multiple memory units as well as other components. These components are interfaced by system interface unit 140. System interface unit 140 may include some of the following components: external memory controllers 142, external DDR interface unit 144, PCI bridge 146, local bus 148, bus arbitrator 150, Dual UART unit 152, dual I²C unit 154, a four channel DMA 156, interrupt controller 158, protection and configuration unit 160, system reset unit 162 and clock synthesizer 164. It is noted that other interfacing components can be used.

Figure 3:
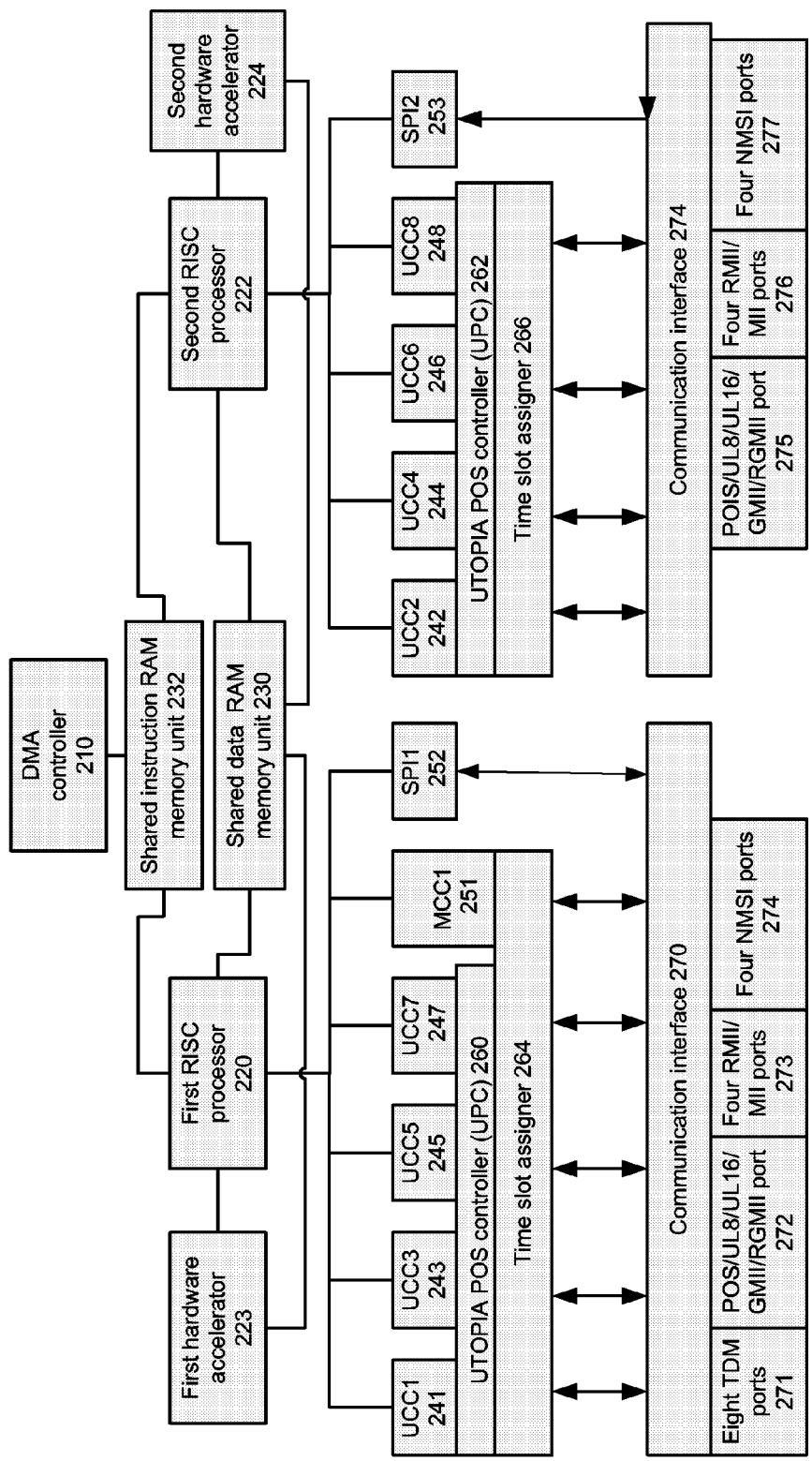
FIG. 3 illustrates a communication engine, according to an embodiment of the invention.

FIG. 3 illustrates a communication engine 200, according to an embodiment of the invention.

It is noted that FIG. 3 illustrates an embodiment of the invention and that other communication engines (including those who have a single processor or more that two processors) can be used.

The communication engine 200 is a versatile communication component that can manage multiple communication ports that operate according to different communication protocols. It includes two RISC processors 220 and 222 that can work substantially independently from each other.

The communication engine 200 includes two RISC processors 220 and 222, two DMA controllers 210, a shared data RAM memory unit 230, a shared instruction RAM memory unit 232, eight universal communication controllers denoted UCC1-UCC8 241-248, one multi-channel communication controller (MCC) 251, two serial peripheral interfaces denoted SP1-SP2 252-253, two UTOPIA POS controllers 261 and 262, two time slot assigners 264 and 266 and two communication interfaces 270 and 274. Time slot assigner 264 assigns time slots for accessing communication interface 270. Time slot assigner 266 assigns time slots for accessing communication interface 274.

The first communication interface 270 is connected to multiple time division multiplex (TDM) ports that are collectively denoted 271, a UTOPIA-packet over SONET (POS) port 272, as well as four RMII ports collectively denoted 273, and four NMSI ports collectively denoted 274.

The second communication interface 274 is connected to another UTOPIA-packet over SONET (POS) port 275, four RMII ports collectively denoted 276, and four NMSI ports collectively denoted 274. It is noted that other communication protocols can be supported by communication device 10.

Each RISC processor out of 220 and 222 can access the shared data RAM memory unit 230 and the shared instruction RAM memory unit 232. RISC processor 220 can control half of the multiple communication controllers and ports. For example, RISC processor 220 can control UCC1-UCC4 241-244, MCC 251 and SPI1 252. It can also communicate with UTPOIA POS controller 260 and time slot assigner 264.

Conveniently, a UCC can support the following communication protocols and interfaces (not all simultaneously): 10/100 Mbps Ethernet, 1000 Mpbs Ethernet, IPv4 and IPv6, L2 Ethernet switching using, ATM protocol via UTOPIA interface, various types of HDLC, UART, and BISYNC.

Conveniently, MCC 251 supports two hundred and fifty six HDLC or transparent channels, one hundred and twenty eight SS#7 channels or multiple channels that can be multiplexed to one or more TDM interfaces.

In addition, the communication engine 200 can include a controller (not shown) as well as an interrupt unit that coordinate the various components of the communication engine, as well as to enable the communication engine 200 to communicate with general-purpose processor 110, security engine 62 and system interface unit 140.

The first RISC processor 220 is connected to a first hardware accelerator 223. The first hardware accelerator 223 can access the shared data RAM memory unit 230. The second RISC processor 222 is connected to a second hardware accelerator 224.

Figure 4:
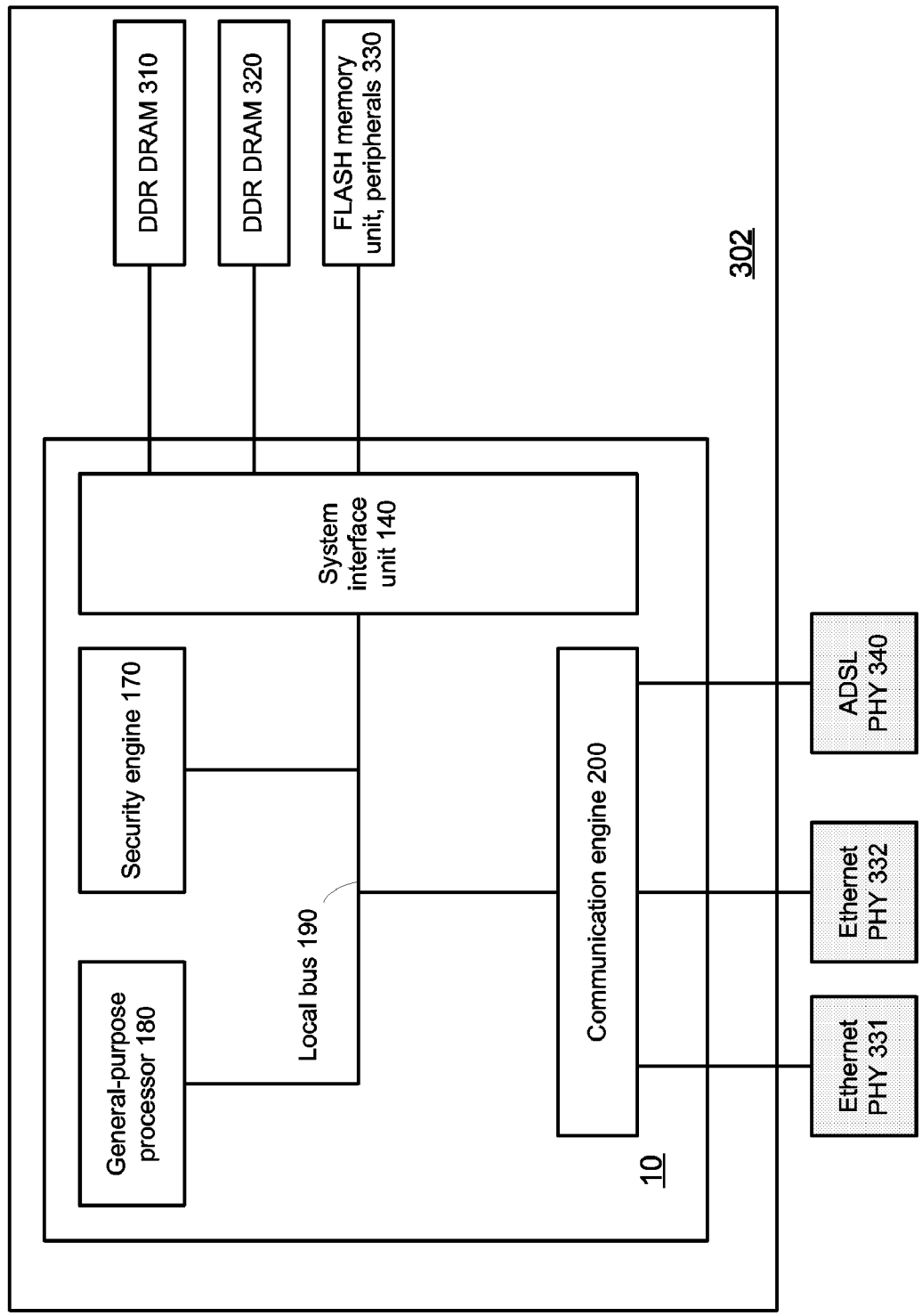
FIG. 4 illustrates an exemplary configuration of the communication device, and its environment, according to an embodiment of the invention.

FIG. 4 illustrates an exemplary configuration of communication device 10, and its environment, according to an embodiment of the invention.

Communication device 10 is illustrated as supporting a data path of a DSL line card 302. The DSL line card 302 is a part of access network 101 of FIG. 1. This DSL card 302, as well as many other DSL line cards can be long to a DSLAM.

Line card 302 also includes two DDR DRAM units 310 and 310, as well as a flash memory unit 330, all being connected to communication device 10 via the system interface unit 140.

The communication engine 200 is configured as an xDSL line card and is connected to multiple Ethernet PHY units 330 and 332, as well as to multiple ADSL PHY units 340. The communication device 10 supports ATM multi-phy subscriber lines and an Ethernet uplink.

Each PHY unit out of units 331, 332 and 340 can receive different types of traffic. Each traffic thread can be associated with a different quality of service level.

Each PHY unit can be associated with one or more channels. Conveniently, at least one channel that is connected to a single PHY unit can be used for exchanging different types of traffic using different queues.

Figure 5:
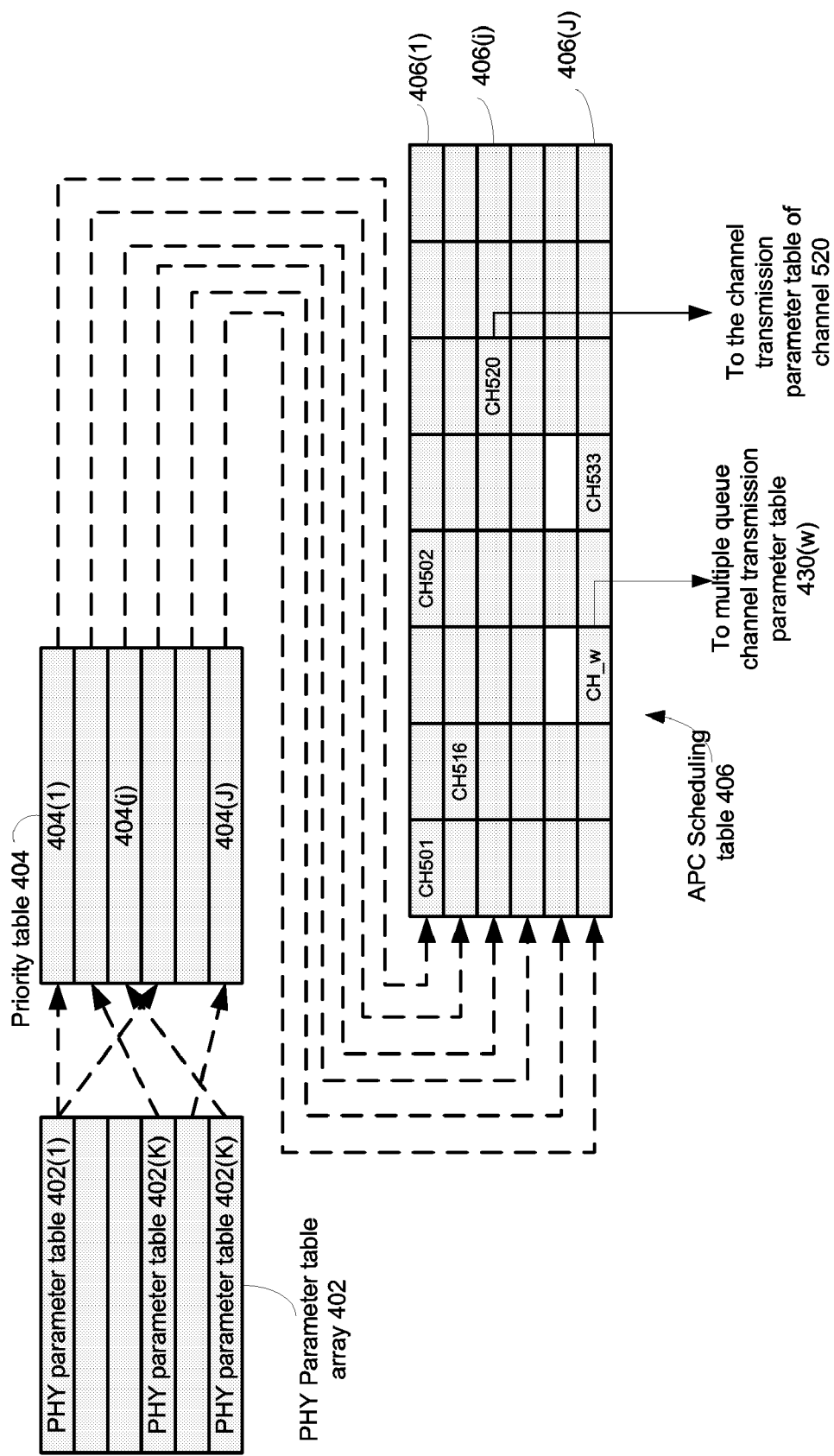
FIG. 5 illustrates exemplary data structures, according to an embodiment of the invention.

FIG. 5 illustrates exemplary data structures, according to an embodiment of the invention.

According to an embodiment of the invention most if not all of the data structures illustrated in FIG. 5-FIG. 8 are stored in the shared data RAM memory unit 230, and that each communication controller out of UCC1-UCC8 241-248 can schedule a transmission of frames.

The scheduler can apply various scheduling schemes. FIG. 5 illustrates the various data structures that are used during APC (ATM Pace control) scheduling.

APC scheduling is responsive to the following parameters: channel priority level, bandwidth of each channel, and ATM traffic pacing parameters such as peak cell rate (PCR), sustain cell rate (SCR) and minimum cell rate (MCR). For example real time (RT) constant bit rate (CBR) traffic can have the highest priority and is scheduled in response to its PCR. Real time (RT) variable bit rate (VBR) traffic can have a lower priority and is scheduled in response to its PCR and SCR. Non real time (NRT) variable bit rate (VBR) traffic can have even a lower priority and is scheduled in response to its PCR and SCR. Unspecified bit rate (UBR and UBR+) have the lowest priorities and are scheduled in response to their PCR and MCR (UBR+) or only their PCR (UBR). Scheduling mechanisms that are responsive to these parameters are known in the art are require not additional explanation.

The first data structure is PHY parameter table array 400. Array 400 includes multiple PHY parameter tables 402(1)-402(K). The k'th PHY parameter table 402(k) defines various parameters of a PHY layer entity. A PHY layer entity can correspond to a single physical link that is connected to the access network 101. The k'th PHY parameter table 400(k) includes at least one pointer to a priority table entry 404(j), a number of cells to be sent during a scheduler time slot and expected time duration field. The priority table 404 includes multiple entries (404(1)-404(J)) wherein each entry corresponds to a single priority.

A single PHY entity can be associated with multiple channels of different priorities. Accordingly, a single PHY parameter table can be linked to multiple entries of the priority table 404. The j'th entry (404(j)) of priority table 404 points to the first entry and the last entry of the j'th set of entries (406(j)) of an APC scheduling table 406. The j'th set of entries (406(j)) is associated with the j'th priority level. Conveniently, real time traffic is assigned a higher priority than non-real time traffic.

Each entry of the APC scheduling table 406 out of a set of entries (for example 406(j)) of the APC scheduling table 406 indicates that a certain frame can be transmitted. Each entry of the APC scheduling table 406 can be either empty or include a channel identification number and a link to a transmission parameter table. For example, entry 401(1,1) includes a channel identification number CH501 (channel 501) and points to the channel transmission parameter table of that channel. Yet for a further examples, entries 406(1,4), 406(2,2), 406(j,5), 406(J,3) and 406(J,5) include the following channel identification numbers: CH502, CH516, CH520, CH_w and CH533. Each such entry points to a channel transmission parameter table associated with that channel. Each of these channels can be a single queue channel of a multiple queue channel. Accordingly, there entries point to single queue channel transmission parameter tables or multiple queue channel transmission parameter tables. It is assumed that the w'th channel is a multiple queue channel, accordingly entry 406(J,3) points to a multiple queue channel transmission parameter table 430(w).

Figure 6:
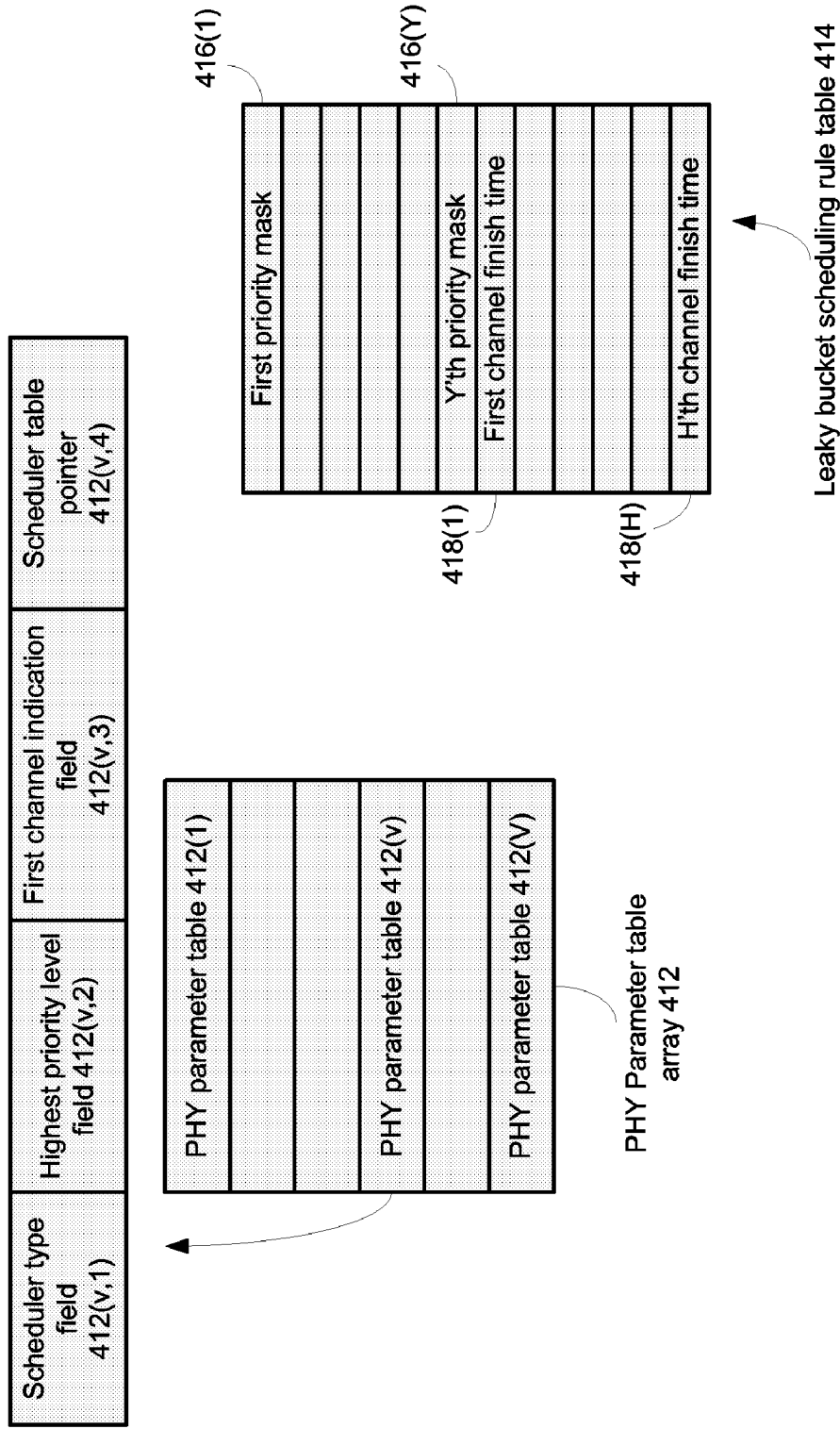
FIG. 6 illustrates exemplary data structures, according to an embodiment of the invention.

FIG. 6 illustrates exemplary data structures, according to an embodiment of the invention.

When applying leaky bucket scheduling, multiple data structures are used.

Especially, the scheduler can apply a Generic Cell Rate Algorithm (GCRA) which is an implementation of the leaky bucket algorithm in ATM networks. This algorithm assumes that a buffer is filled by arriving cells while it is emptied at a rate that is responsive to the peak cell rate. When the buffer is filled over a certain fullness threshold the cell that caused this overflow is dropped.

The first array of data structures includes an array of PHY parameter tables 412(1)-412(V). The v'th PHY parameter table 412(v) defines various parameters of a PHY layer entity. PHY parameter table 412(v) includes multiple entries such as: (i) scheduler type field 412(v,1) indicating that a leaky bucket scheduling mechanism is used, (ii) a highest priority level field 412(v,2) indicating whet is the highest priority level allocated to the PHY entity, (iii) a first channel indication field 412(v,3) indicative of the number (identity) of the first channel that belongs to this PHY entity that has the highest priority level, and (iv) a scheduler table pointer 412(v,4) that points to the leaky bucket scheduling rule table 414.

The leaky bucket scheduling rule table 414 has multiple mask entries 416(1)-416(Y), and multiple channel finish time entries 418(1)-418(H). The y'th mask entry 416(y) stores a y'th priority mask that indicates the channels that belong to the y'th priority level. The h'th channel finish time entry 418(h) stores a channel theoretical time of the next transmission of the h'th channel.

The GCRA scheduling mechanism includes scheduling the transmissions from channels (multiple queue channels or single queue channels) in response to their priority and their theoretical time of next transmission whereas higher priority channels that are associated with earlier theoretical times of next transmission are scheduled to be transmitted before lower priority channels that have later theoretical times of next transmission.

Conveniently, a GCRA scheduler does not require a table that stores Channel Code (CC) numbers. Instead, the GCRA scheduler uses a parameter denoted a first channel code number of the channels in this PHY.

The scheduler selects a queue for transmitting from by searching for a minimal valued queue (minimum value GCRA). If that queue is allowed to transmit according to its contract the scheduler selects this queue and provides an index to the queue. In addition the final CC is calculated and selected by the following equation: CC=First CC+index.

Theoretical time is determined by the value configured in the TCT (TCTE) as an increment. The next theoretical value is calculated by adding a current value in the theoretical time to the value which is specified in the in the TCT or TCTE to recalculate the next theoretical value. The value is determined according to the service contract e.g. CBR or VBR.

Figure 7:
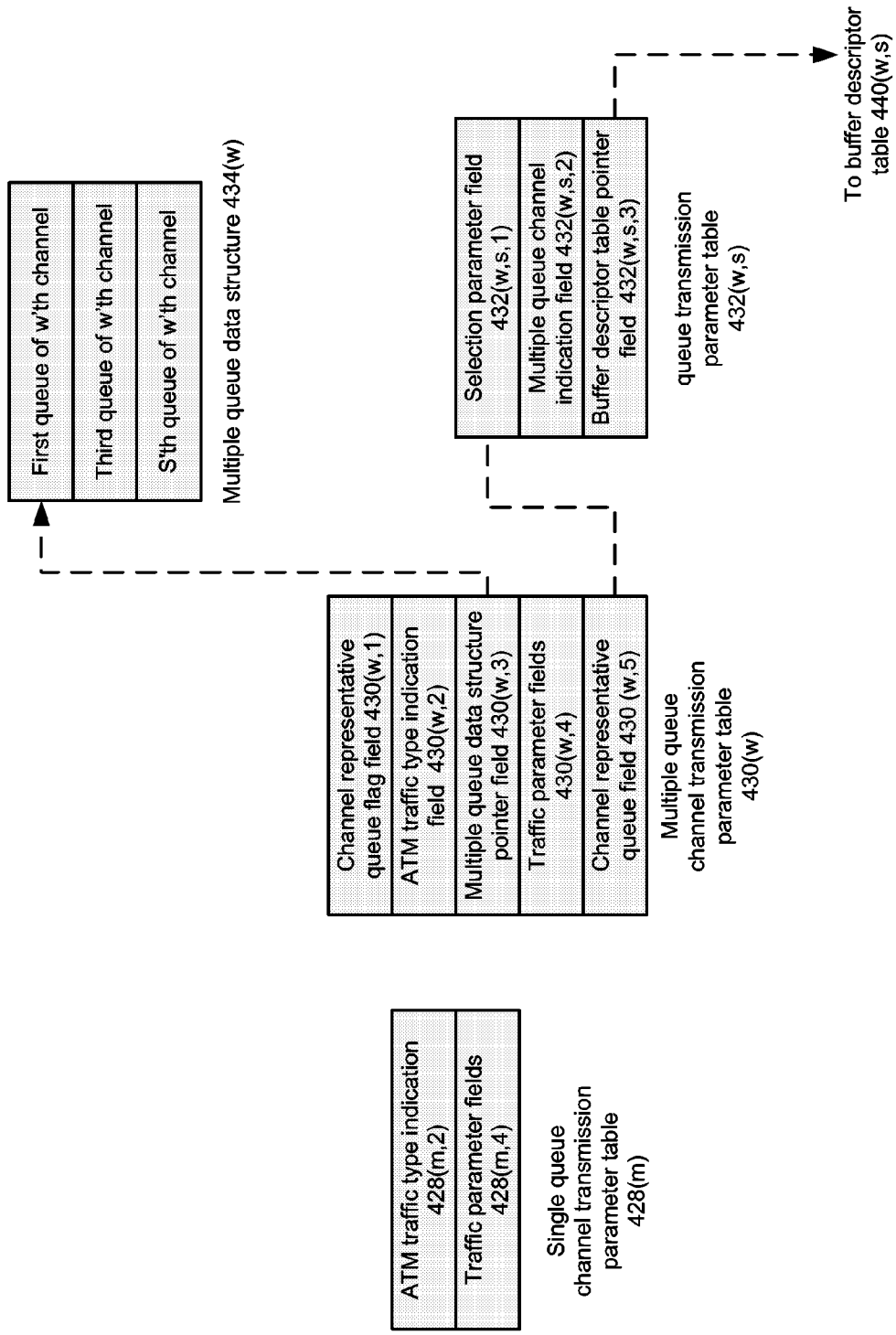
FIG. 7 illustrates exemplary data structures, according to an embodiment of the invention.

FIG. 7 illustrates exemplary data structures, according to an embodiment of the invention.

There are various types of transmission parameter tables including a multiple queue channel transmission parameter table (such as table $430(w)$), a queue transmission parameter table (such as table $432(w,s)$) and a single queue channel transmission parameter table (such as table $428(m)$). Indexes w and m denote channel numbers while index s denoted a queue number.

A full entry of the APC scheduling table 406 can point to a multiple queue channel transmission parameter table or to a single queue channel transmission parameter table. A multiple queue channel transmission parameter table points to a queue transmission parameter table associated with the channel representative queue of that channel.

A single queue channel transmission parameter table 428 ($m$) includes: (i) an ATM traffic type indication field $430(m,2)$ that indicates whether the traffic is CBR, UBR, real time or nor real time traffic and the like, and (ii) traffic parameter fields collectively denoted $430(m,3)$ that can include an adaptation layer type field, peak cell rate field, peak cell rate fraction field, burst tolerance field, and the like.

A multiple queue channel transmission parameter table $430(w)$ includes: (i) a channel representative queue flag field $430(w,1)$ indicating that the transmission parameter table is associated with channel representative queue; (ii) ATM traffic type indication field $430(w,2)$ that indicates whether the traffic is CBR, UBR, real time or nor real time traffic and the like, (iii) multiple queue data structure pointer field $430(w,3)$, (iv) traffic parameter fields collectively denoted $430(w,4)$ that can include an adaptation layer type field, peak cell rate field, peak cell rate fraction field, burst tolerance field, and the like, and (v) channel representative queue field $430(w,5)$ indicative of the currently selected queue. The value of the last field can be s.

The multiple queue data structure pointer field $430(w,3)$ points to a multiple queue data structure $434(w)$. Data structure $434(w)$ includes a list of all active queues that participate in a selection of a channel representative queue of the w'th channel. For example, data structure $434(w)$ includes the following queues—$Q(w,1)$, $Q(w,3)$, $Q(w,s)$.

A queue transmission parameter table $432(w,s)$ includes: (i) a selection parameter field $432(w,s,1)$ that includes a weight for weighting fair queue selection between queues or another selection value that can affect the selection of the queue; (ii) multiple queue channel indication field $432(w,s,2)$ that indicates the channel to which the queue belongs, and (iii) buffer descriptor table pointer field $432(w,s,3)$. The buffer descriptor field (w,s,3) points to a table of buffer descriptors associated with that queue.

Figure 8:
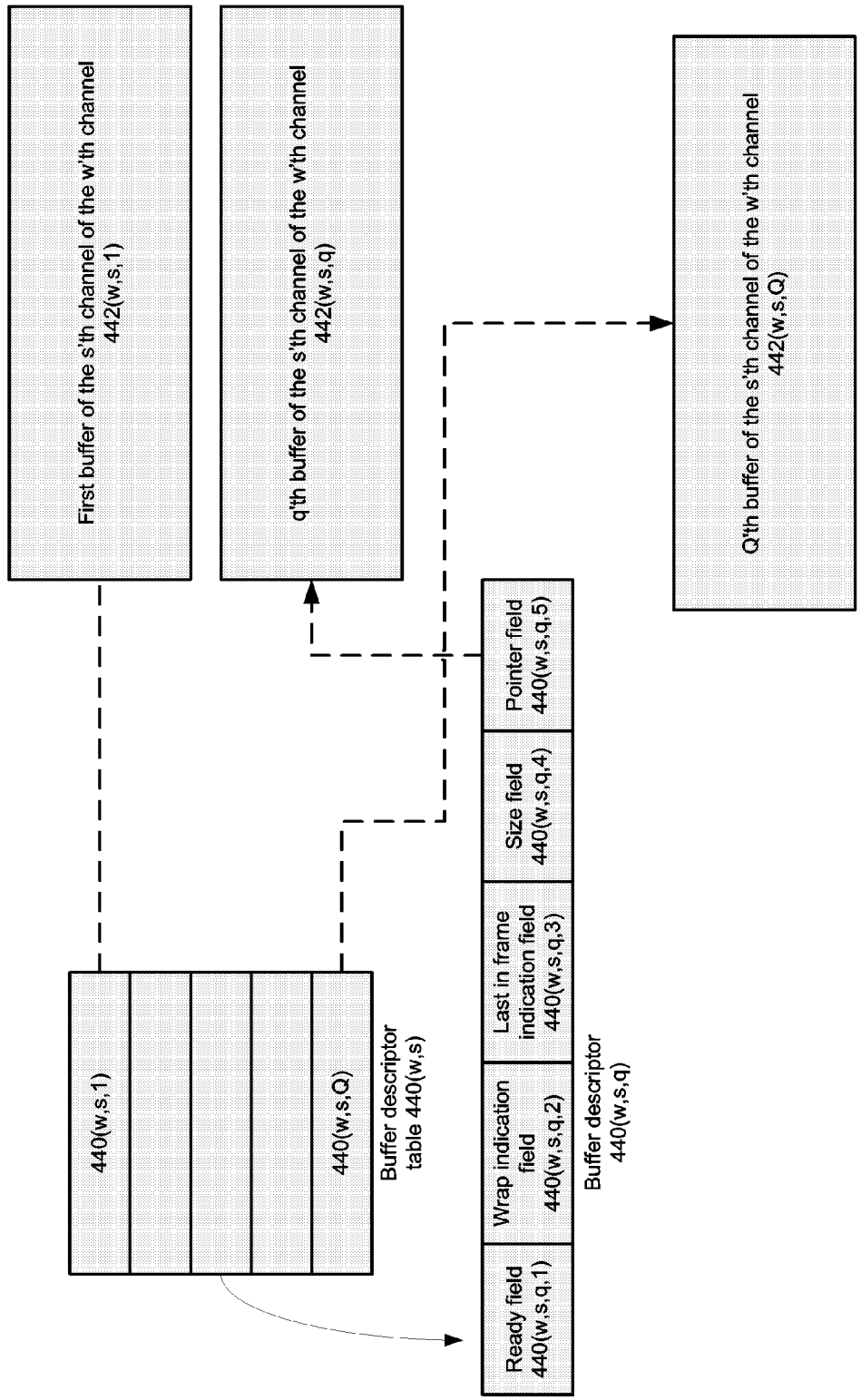
FIG. 8 illustrates exemplary data structures, according to an embodiment of the invention.

FIG. 8 illustrates exemplary data structures, according to an embodiment of the invention.

The buffer descriptor table pointer field $432(w,s,5)$ of FIG. 7 points to a set of buffer descriptors $440(w,s,1)$-$440(w,s,Q)$ that are collectively denoted $440(w,s)$. These are the buffer descriptors that are associated with the s'th queue of the w'th channel. The q'th buffer descriptor $440(w,s,q)$ of that set includes: (i) a ready field $440(w,s,q,1)$ indicating whether the buffer is ready for transmission, (ii) a wrap indication field $440(w,s,q,2)$ indicating that the buffer descriptor should be read in a cyclic manner, (iii) a last in frame indication field $440(w,s,q,3)$ indicating if the buffer descriptor points to the last buffer in the frame, (iv) a size field $440(w,s,q,4)$ indicative of the number of octets to be transmitted from the buffer field, (v) pointer field $440(w,s,q)$ that points to a buffer register $442(w,s,q)$ that includes data to be transmitted.

FIG. 8 illustrates three entries $440(w,s,1)$, $440(w,s,q)$ and $440(w,s,Q)$. The first entry $440(w,s,1)$ points to the first buffer of the s'th channel of the w'th channel $442(w,s,1)$. The q'th entry $440(w,s,q)$ points to the q'th buffer of the s'th channel of the w'th channel $442(w,s,q)$. The Q'th entry $440(w,s,Q)$ points to the first buffer of the s'th channel of the w'th channel $442(w,s,Q)$. Each of these buffers $442(w,s,1)$, $442(w,s,q)$ and $442(w,s,Q)$ stores data to be transmitted.

Figure 9:
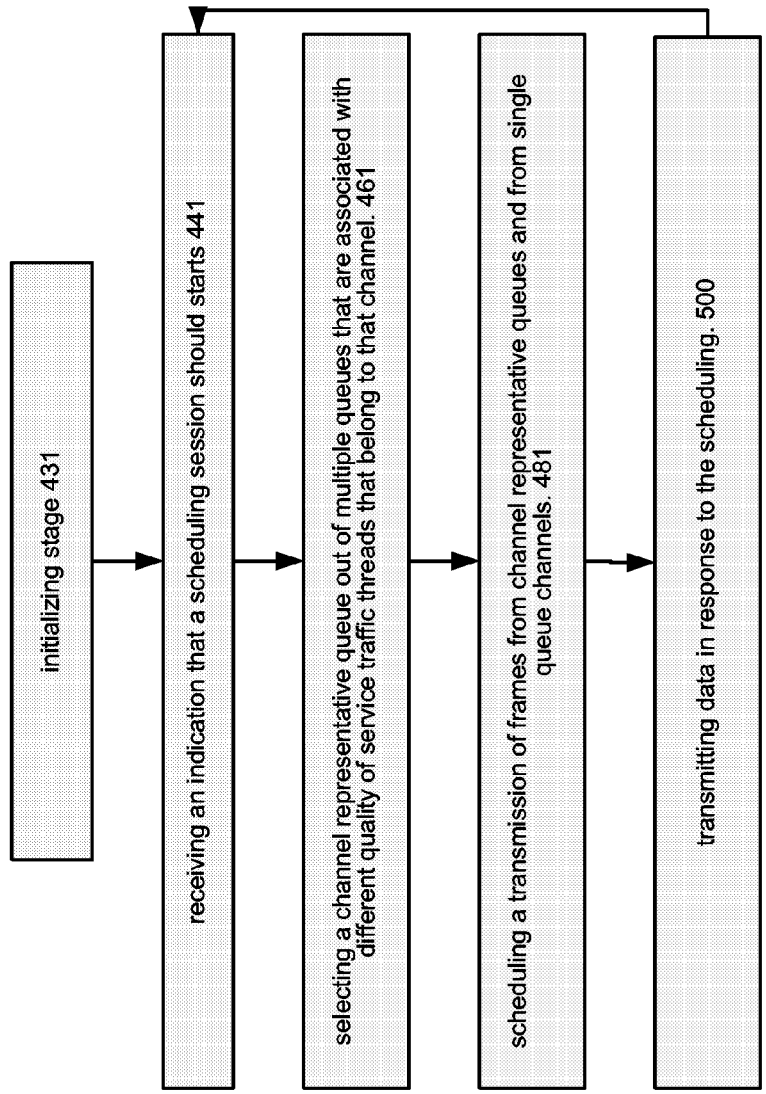
FIG. 9 is a flow chart of a method for scheduling a transmission of ATM cells, according to an embodiment of the invention.

FIG. 9 illustrates a method for scheduling a transmission of ATM cells, according to an embodiment of the invention.

Method 400 starts by initializing stage 431 during which multiple data structures should be updated or initialized.

For example, stage 431 can include associating buffer descriptors with buffers that store data to be transmitted and associating a set of buffer descriptors with a transmission parameter tables.

Referring to the previous example, an initializing stage 431 can include determining which multiple queue channels are active (their buffers include data or are supposed to include data to be transmitted) and which single queue channels are active. The list of active queues of each channel is written to data structures such as multiple queue data structure $434(w)$. Buffers that include data (such as buffers $442(w,s,1)$-$442(w,s,Q)$ are associated to their buffer descriptors ($440(w,s,1)$-$440(w,s,Q)$). Buffer descriptors (such as $440(w,s,1)$-$440(w,s,Q)$) of queues that belong to multiple queue channels are linked to queue transmission parameter tables (such as $432(w,s)$) that in turn are linked to multiple channel transmission parameter tables (such as $430(w)$). Buffer descriptors of queues that belong to single queue channels are linked to single queue transmission parameter tables (such as $428(m)$).

The various transmission parameter tables are linked to scheduling table entries such as entries of a APC scheduling table or a leaky bucket scheduling table.

One or more scheduling tables are filled according to various parameters and are further linked to PHY parameter tables (in case of leaky bucket scheduling) or to priority tables that are linked to PHY parameter tables (in case of APC).

Stage 431 is followed by stage 441 of receiving an indication that a scheduling session should starts. It is noted that such an indication can be provided in various occasions. For example, when a device is initiated, when there is data to transfer, when there was a request from a user to receive data and the like. The indication can be provided in a periodic manner, in a pseudo-random manner, in response to occurrence of an event and the like.

Stage 441 is followed by stage 461 of selecting a channel representative queue out of multiple queues that are associated with different quality of service traffic threads that belong to that channel. Conveniently, stage 460 of selecting includes applying a weighted fair queue algorithm. Stage 461 can be applied during a first iteration of method 400. During repetitive iterations of method 400 stage 461 conveniently occurs after a previously selected channel representative queue was scheduled for transmission.

Stage 461 is followed by stage 481 of scheduling a transmission of frames from channel representative queues and from single queue channels. Stage 481 includes processing a scheduling table that includes multiple sets of entries. Each set of entries is associated with a different transmission priority level. At least one set of entries includes a link to a transmission parameter table that is associated with a channel representative queue.

Referring to the example set forth in FIG. 5, APC scheduling table 460 can be searched in order to select one entry. The selection can be responsive to the priority level of that entry as well as to additional parameters. It is noted that even if an entry is selected the transmission still is dependent upon various parameters included within one or more transmission parameter tables associated with that channel. These various parameters can include, for example. Traffic parameter fields such as 430(w,4).

Conveniently, stage 481 may include applying a leaky bucket algorithm, or applying an APC algorithm, but this is not necessarily so.

Conveniently, stage 481 of scheduling includes accessing a transmission parameter table and searching for a channel representative queue flag indicating whether the transmission parameter table is associated with channel representative queue or with a single queue channel.

Stage 481 is followed by stage 500 of transmitting data in response to the scheduling. Stage 500 can be followed by stage 461. It is noted that the repetition of stages 461-500 can be controlled by various control parameter such as the existence of data to transit, the readiness of the transmitter to transmit and of a recipient to receive data, a need to update one or more data structure to reflect, for example, priority changes, and the like.

Figure 10:
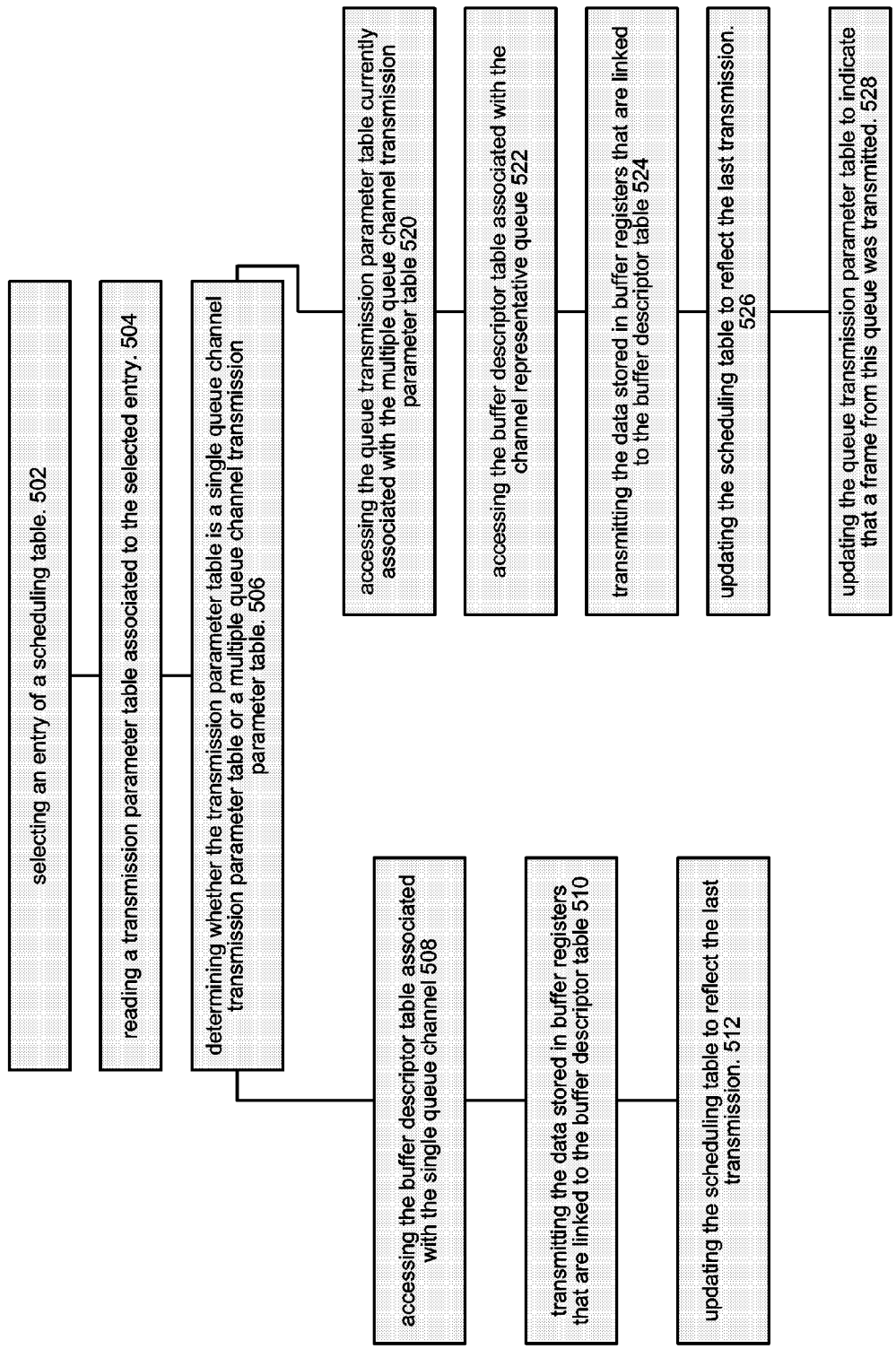
FIG. 10 is a flow chart of a transmission stage, according to an embodiment of the invention.

FIG. 10 illustrates a transmission stage 500, according to an embodiment of the invention.

Stage 500 of transmitting starts by stage 502 of selecting an entry of a scheduling table.

Stage 502 is followed by stage 504 of reading a transmission parameter table associated to the selected entry.

Stage 504 is followed by stage 506 of determining whether the transmission parameter table is a single queue channel transmission parameter table or a multiple queue channel transmission parameter table.

If the transmission parameter table is a single queue channel transmission parameter table then stage 506 is followed by stage 508 of accessing the buffer descriptor table associated with the single queue channel, stage 510 of transmitting the data stored in buffer registers that are linked to the buffer descriptor table, and stage 512 of updating the scheduling table to reflect the last transmission.

If the transmission parameter table is a multiple queue channel transmission parameter table then stage 506 is followed by stage 520 of accessing the queue transmission parameter table currently associated with the multiple queue channel transmission parameter table, stage 522 of accessing the buffer descriptor table associated with the channel representative queue, stage 524 of transmitting the data stored in buffer registers that are linked to the buffer descriptor table, stage 526 of updating the scheduling table to reflect the last transmission.

Stage 526 is followed by stage 528 of updating the queue transmission parameter table to indicate that a frame from this queue was transmitted. This update can include reducing the weight of the queue. For example, stage 528 can include multiplying the length of the transmitted frame by a weight factor assigned to the queue and either adding or reducing this result from the previous weight of the queue.

It is noted that during the next iteration of method 400 a new queue selection session occurs.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for scheduling a transmission of asynchronous transfer mode (ATM) cells, the method comprises:
receiving at a communication controller an indication that a session for scheduling ATM cells in the communication controller starts;
in response to receiving the indication, selecting, by the communication controller, a channel representative queue of a plurality of channel representative queues, the plurality of channel representative queues being associated with a multiple queue channel, wherein the plurality of channel representative queues are each associated with a different quality of service traffic thread of the multiple queue channel;
selecting from a scheduling table a particular set of entries from among a plurality of sets of entries, wherein:
each set of entries of the plurality of sets of entries is associated with a different channel having a different transmission priority level;
a first set of entries of the plurality of sets of entries includes a first link to a first channel transmission parameter table associated with the multiple queue channel; and
a second set of entries of the plurality of sets of entries include a second link to a second channel transmission parameter table associated with a single queue channel; and
in response to selecting the particular set of entries, transmitting, by the communication controller, an ATM cell.

2. The method according to claim 1:
wherein each of the plurality of channel representative queues comprises multiple buffer descriptors;
the method further comprising:
associating each buffer descriptor with a buffer that stores ATM cells to be transmitted: and
associating a set of buffer descriptors with the first channel transmission parameter table.

3. The method according to claim 1 wherein the selecting from the scheduling table is based upon a leaky bucket algorithm.

4. The method according to claim 1 wherein the selecting the channel representative queue is based upon a weighted fair queue algorithm.

5. The method according to claim 1 wherein the selecting from the scheduling table further comprises:
accessing a particular transmission parameter table; and
searching for a channel representative queue flag indicating whether the particular transmission parameter table is associated with the channel representative queue or with the single queue channel.

6. The method according to claim 1 wherein if the particular set of entries is the second set of entries, then the method further comprises:
accessing a buffer descriptor table pointed to by the second channel transmission parameter table;

transmitting an ATM cell stored in buffer registers that are linked to the buffer descriptor table; and
updating the scheduling table to reflect the last transmission.

7. The method according to claim 1 wherein if the particular set of entries is the first set of entries, then the method further comprises:
accessing a queue transmission parameter table associated with the channel representative queue;
accessing a buffer descriptor table associated with the queue transmission parameter table;
transmitting an ATM cell stored in buffer registers that are linked to the buffer descriptor table;
updating the scheduling table to reflect the last transmission; and
updating the queue transmission parameter table to indicate that an ATM cell from the channel representative queue was transmitted.

8. A device for scheduling a transmission of asynchronous transfer mode (ATM) cells, the device comprises:
a memory unit adapted to store multiple buffers;
a communication controller adapted to:
select a channel representative queue out of a plurality of channel representative queues, wherein the plurality of channel representative queues are each associated with a different quality of service traffic thread, and the plurality of channel representative queues are each associated with a respective multiple queue channel;
select from a scheduling table a particular set of entries from among a plurality of sets of entries, wherein:
each set of entries of the plurality of sets of entries is associated with a different channel having a different transmission priority level;
a first set of entries of the plurality of sets of entries includes a first link to a first channel transmission parameter table associated with the multiple queue channel; and
a second set of entries of the plurality of sets of entries includes a second link to a second channel transmission parameter table associated with a single queue channel; and
in response to selecting the particular set of entries, schedule a transmission of ATM cells from the plurality of channel representative queues and from a single queue channel.

9. The device according to claim 8 wherein:
each of the plurality of channel representative queues comprises multiple buffer descriptors; and
the device is adapted to associate buffer descriptors with buffers that store the ATM cells to be transmitted and to associate a set of buffer descriptors with the transmission parameter table.

10. The device according to claim 9, wherein the communication controller is adapted to access the transmission parameter table and to search for a channel representative queue flag indicating whether the transmission parameter table is associated with the channel representative queue or with a single queue channel.

11. The device according to claim 9 wherein the communication controller is adapted to transmit the ATM cells in response to the scheduling.

12. The device according to claim 9 wherein the communication controller is adapted to apply a leaky bucket algorithm.

13. The device according to claim 8 wherein the communication controller is adapted to transmit the ATM cells in response to the scheduling.

14. The device according to claim 8 wherein the communication controller is adapted to apply a leaky bucket algorithm.

15. The device according to claim 8 wherein the communication controller is adapted to apply a weighted fair queue algorithm.

16. The device according to claim 8 wherein the communication controller is adapted to select an entry of the scheduling table, read a channel transmission parameter table associated to the selected entry, and determine whether the channel transmission parameter table is a single queue channel transmission parameter table or a multiple queue channel transmission parameter table.

17. The device according to claim 16 wherein if the channel transmission parameter table is a single queue channel transmission parameter table then the communication controller is adapted to access a buffer descriptor table pointed by the channel transmission parameter table, transmit the ATM cells stored in buffer registers that are linked to the buffer descriptor table, and update the scheduling table to reflect the last transmission.

18. The device according to claim 16 wherein if the channel transmission parameter table is a multiple queue channel transmission parameter table then the communication controller is adapted to access a queue transmission parameter table currently associated with the multiple queue channel transmission parameter table, access a buffer descriptor table associated with the queue transmission parameter table, transmit the ATM cells stored in buffer registers that are linked to the buffer descriptor table, update the scheduling table to reflect the last transmission, and update the queue transmission parameter table to indicate that a particular ATM cell from this queue was transmitted.

* * * * *